Sept. 13, 1932.                F. C. BIGGERT, JR                1,876,838
                                  FLYING CUTTER
                              Filed Oct. 25, 1929          4 Sheets-Sheet 1
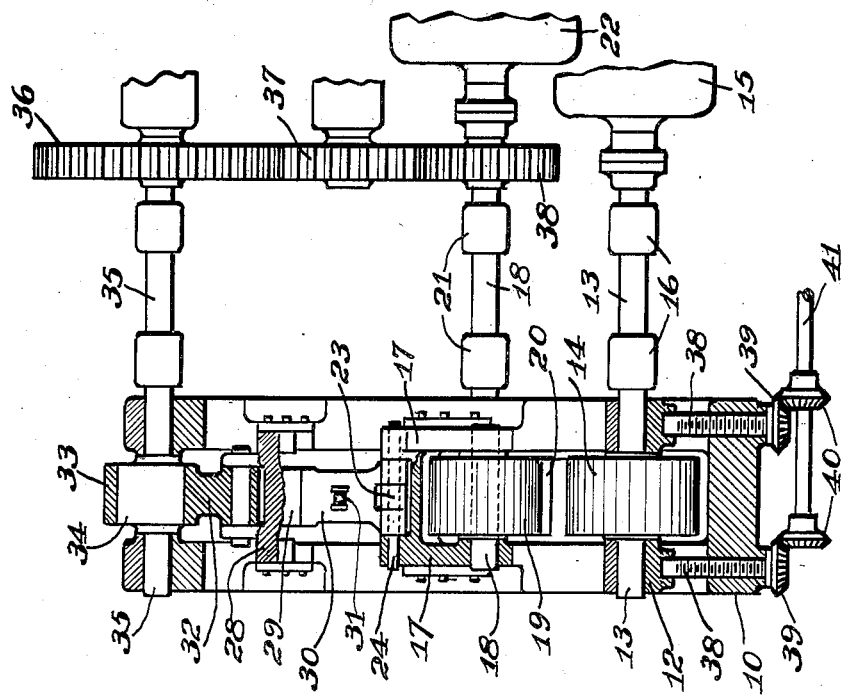
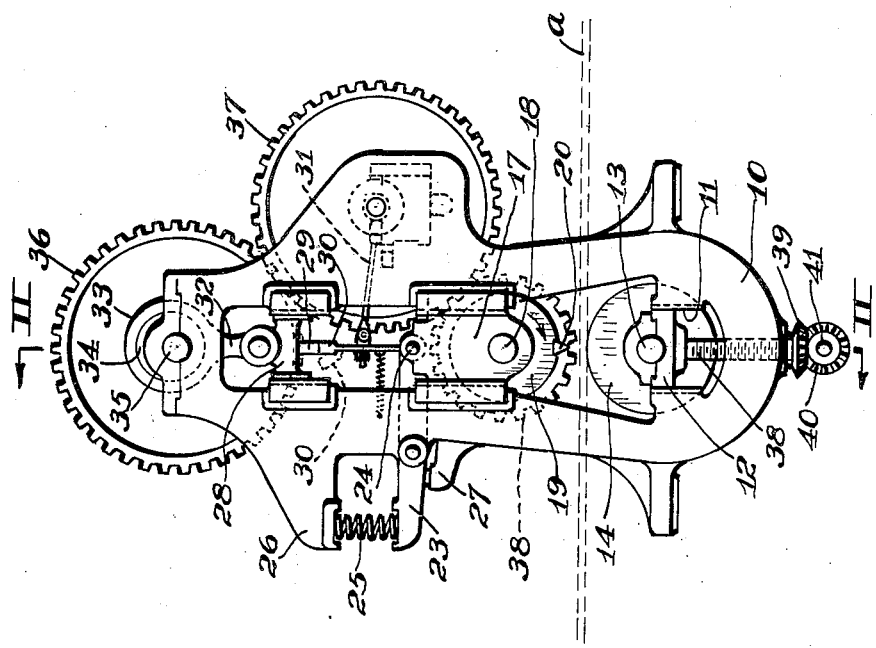
WITNESSES                                              INVENTOR Sept. 13, 1932.  F. C. BIGGERT, JR  1,876,838
FLYING CUTTER
Filed Oct. 25, 1929  4 Sheets-Sheet 2
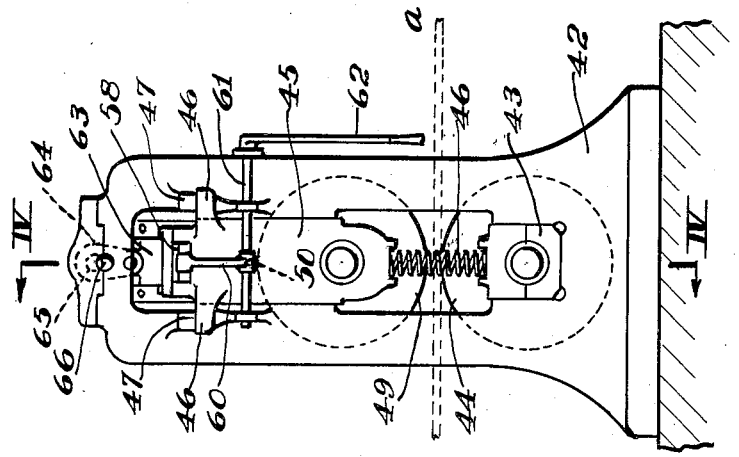
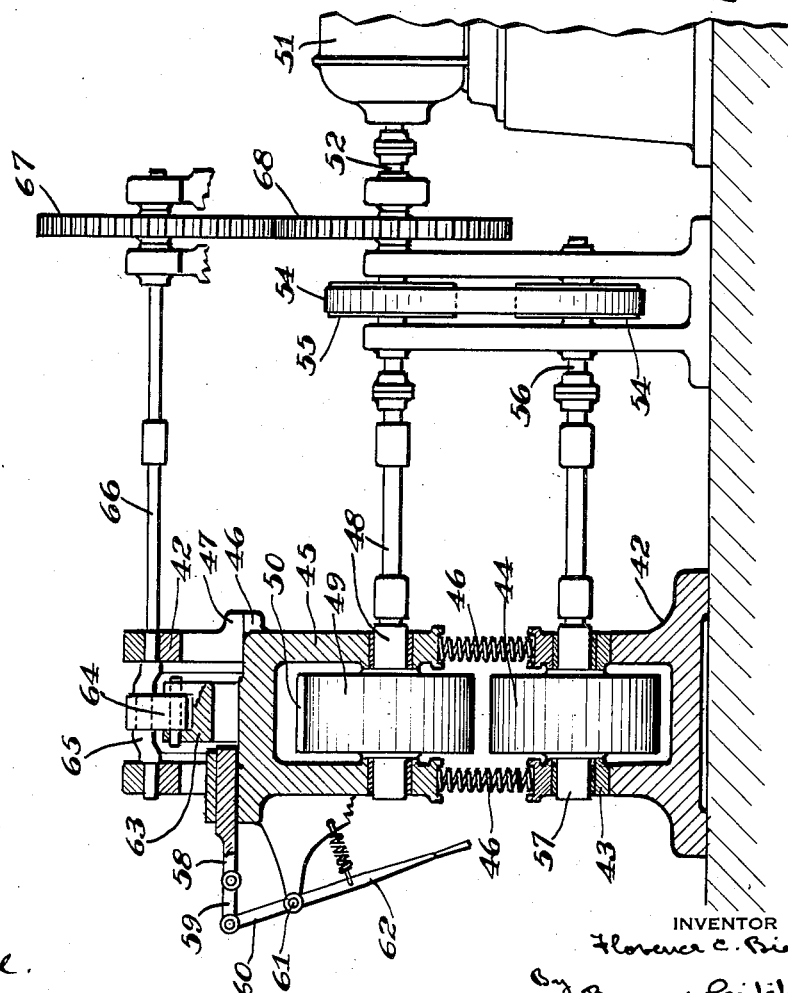

Sept. 13, 1932. F. C. BIGGERT, JR 1,876,838
FLYING CUTTER
Filed Oct. 25, 1929 4 Sheets-Sheet 3

WITNESSES
W.B.Wallace.
Charles J. Cope

INVENTOR
Florence C. Biggert Jr
By Brown & Critchlow
attys.

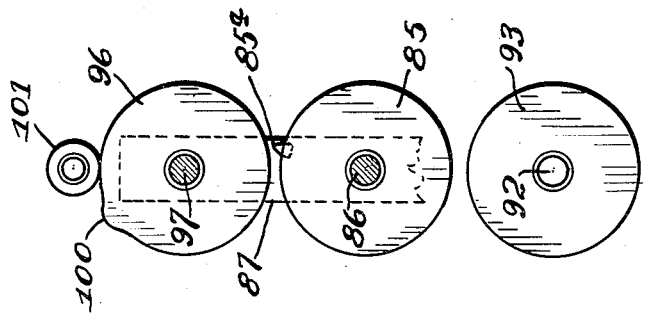
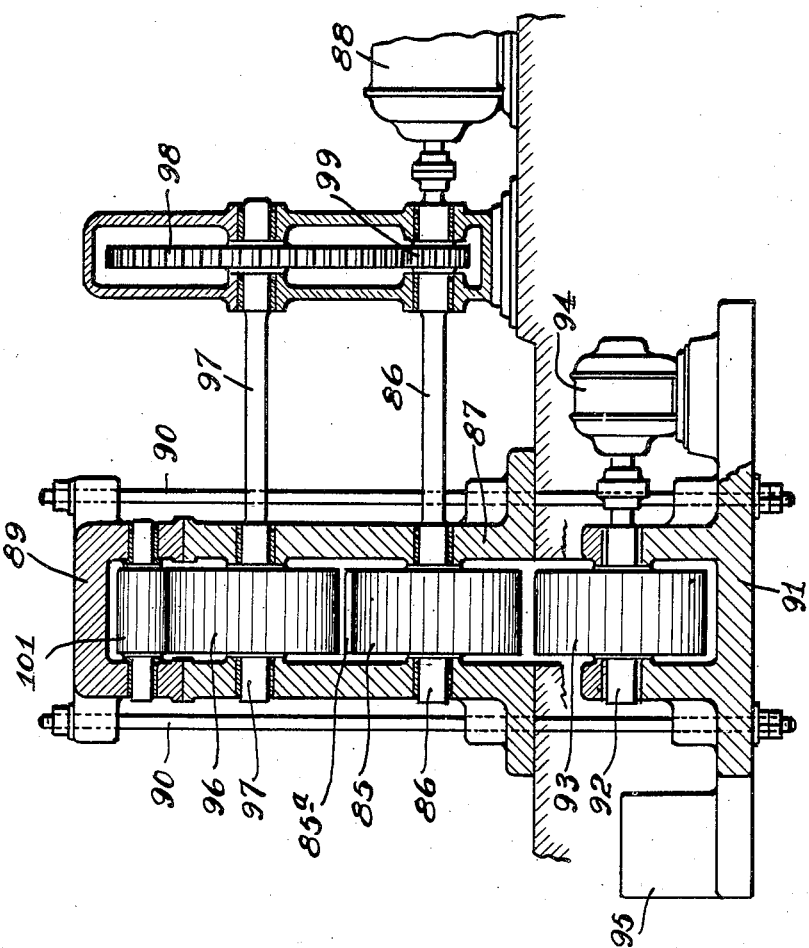

Patented Sept. 13, 1932

1,876,838

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

FLYING CUTTER

Application filed October 25, 1929. Serial No. 402,381.

My invention pertains to what may be termed flying cutters, that is to say devices for cutting, in transit, moving material such as the strip or band metal handled in rolling mills.

For the purpose of cutting metal strips, for example, into lengths during movement thereof, it has been proposed to provide pairs of blades which are rotated substantially at the same face speed as that at which the strip moves, the blades of each pair being arranged so as to come into registry, so that upon the blades being caused to approach each other they will shear through the strip which is between them without impeding the movement of the latter. Such devices have the disadvantage that correct registry of the blades, to obtain a good shearing action, is difficult to maintain as the parts become worn under the shocks and other hard service to which such devices are subjected. Moreover wear of the blades themselves takes place relatively rapidly, necessitating frequent grindings, adjustments and replacements.

It is the principal object of my invention to provide a flying cutter in which any difficulty in connection with the registry of blades with respect to each other is eliminated, in which the requirements for grinding, adjustment or replacement are reduced to a minimum, and which, at the same time, is so constituted that the periods at which the cutting operations of the device will take place can be readily controlled. Other objects will appear from the following specification and the claims annexed thereto.

I have described, by way of example, in the following specification, and shown in the accompanying drawings, several forms of flying cutter in which my invention is embodied. It is to be understood, however, that the invention may take still other forms, and that changes may be made in the forms described and shown, without exceeding the scope thereof as defined in the appended claims.

In the drawings:

Fig. 1 is a side elevation of a form of flying cutter, constructed in accordance with my invention, in which the anvil roll is stationary and the rotary blade holder is movable into and out of operative relation therewith by means which may be automatically controlled, and in which the anvil roll and blade holder are driven by separate motors, to obtain the slight difference of peripheral speed which constitutes a feature of my invention;

Fig. 2 is a section on the line II—II of Fig. 1;

Fig. 3 is a view similar to Fig. 1 but showing a form of device in which the movement of the blade holder into and out of operative relation with the anvil roll is manually controlled, and in which there is a belt connection between the blade holder and the anvil roll, so that a slight difference of peripheral speed is obtained by slippage;

Fig. 4 is a section on the line IV—IV of Fig. 3;

Fig. 7 is a sectional elevation of another form of device in which the strip is severed at predetermined intervals, the anvil roll, instead of the blade holder, being, in this instance, movable to effect the cut; and Fig. 8 is a schematic side view of the anvil roll, blade holder, cam and cam roll of the device shown in Fig. 7.

Figure 6:
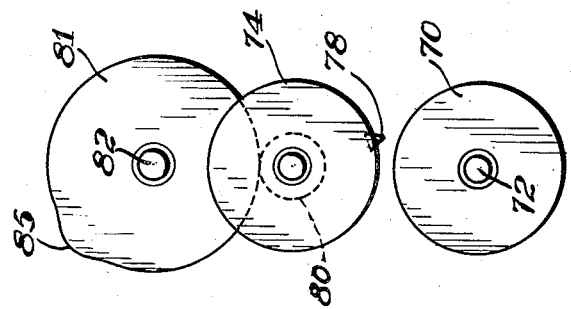
Fig. 6 is a schematic side view showing the anvil roll, the blade holder and one of the cams of the device shown in Fig. 5.

Referring now to the construction shown in Figs. 1 and 2, the device comprises a frame 10 having ways 11 formed in the lower part thereof for receiving bearing boxes 12 in which is rotatably mounted the shaft 13 of an anvil roll 14. This is driven, through the shaft 13, at a peripheral speed which is substantially the same as the linear speed of the strip (a) to be cut, by a suitably controlled electric motor 15, the shaft of which is connected, through universal joints 16, with the shaft 13.

The frame 10 is further provided with vertical ways in which is slidably mounted a yoke 17 which is provided with bearings for receiving the shaft 18 of a blade holder 19 which carries a cutter blade 20. The shaft 18 of the blade holder is connected through suitable universal joints 21 with the shaft of an electric motor 22, such motor being controlled so as to rotate the blade holder 19 at such a speed that the edge of the blade 20 will have a peripheral speed which is substantially the same as the linear speed of the strip a. Normally the blade holder 19 is supported in such a plane that the blade 20, in its rotation, will not approach the anvil roll 14 closely enough to perform any cutting action, the blade holder being depressed when it is desired that a cut shall take place. Thus to support the blade holder, a lever 23 is pivoted to the frame 10 and is formed with a slot in its inner end by means of which it is engaged with a shaft 24 transversely mounted in the upper end of the yoke 17. At its outer end, the lever 23 is formed with a seat for receiving one end of a compression spring 25, the other end of which is mounted in a corresponding seat formed in a bracket 26 extending from the frame 10. Thus the spring 25 at all times tends to raise the blade holder 19 into such a position that the blade 20 will be out of operative relation with the anvil roll 14. The upward movement of the blade holder may be limited in any desired manner, as by forming on the frame 10 a limiting stop 27 which is engaged by the lever 23.

In order to depress the blade holder when it is desired that a cutting operation shall take place, a vertically movable cross head 28 is mounted in ways formed in the frame 10. Such cross head is formed with a downwardly projecting abutment 29 which is adapted to engage the top of a gag plate 30, when such gag plate is in position to be thus engaged, thereby to transmit the vertical movement of the cross head 28 to the yoke 17 and cutter roll. The gag plate 30 is hinged upon the shaft 24 and can be moved, by means of a rod 31, into one or the other of the full and dotted line positions shown in Fig. 1. When the gag plate is in the full line position, the abutment 29 of the cross head will engage its upper end, and, through the gag plate, force the yoke 17 downward, thereby moving the blade holder 19 to bring the blade 20 into operative relation with the resisting roll 14. When the gag plate 30 is in the dotted line position, the abutment 29 will pass it, and no downward movement of the yoke will take place.

For effecting the reciprocating movements of the cross head 28, the latter has pivotally connected thereto a link 32 connected with the strap 33 of an eccentric 34 mounted on a shaft 35 rotatably supported in the frame 10. The shaft 35 has mounted thereon a gear 36 which is driven, through an intermediate gear 37, from a pinion 38 mounted on the shaft of the motor 22 which drives the blade holder 19. The gearing is in an even ratio, so that it can be insured that when the yoke 17 is in its lowermost position, the blade 20 will likewise be in its lowermost position.

During the delivery of the strip a, which is supported so as to run over the anvil roll 14, the gag plate 30 is normally in the dotted line position in Fig. 1, so that, in spite of the continuous reciprocations of the cross head 28, the blade 20 will remain out of operation, its holder being maintained in its upper position. When it is desired, however, to sever the strip, the gag plate 30 is moved, by means of the rod 31, from its dotted into its full line position. When this is done, the abutment 29 strikes the end of the gag plate at the beginning of the downward movement of the cross head 28, whereby the yoke 17 is caused to participate in such downward movement, thereby bringing the blade holder 19 and blade 20 into operative relation with the anvil roll 14. The timing of the device, and the scope of movement of the cross head 28, are such that when the yoke 17 reaches its lowest position, the blade 20 will likewise be in its lowest position and in cutting relation with the face of the anvil roll 14. Since the blade 20 and the anvil roll 14 rotate at substantially the linear speed of the strip a, the latter will be severed without its movement being impeded.

The rod 31 is actuated, to move the gag plate 30 from one position thereof to the other, by means of a device which is automatically operated, as for instance by electric contact or other means controlled by the strip a itself. Such device is the subject of my copending application, Serial No. 402,380, filed October 25, 1929, and does not, of itself, form any part of the present invention.

An important feature of my invention consists in the fact that the blade 20 is made to engage the anvil roll 14 at different circumferential points of the latter in successive cutting operations. Thus any tendency of the blade 20 to wear the anvil roll 14 is distributed over the whole surface of the drum; so that deterioration of the anvil roll by wear is reduced to a minimum. Moreover, by reason of this feature, it becomes practicable to employ an anvil roll which is not hardened; so that the edge of the blade 20 is maintained for a much longer time than would be the case otherwise. I attain this result, in the form of device now being described, by so controlling the speed of the motors 15 and 22 that, although the blade 20 and anvil roll 14 rotate at substantially the linear speed of the strip a, their actual speed is slightly different, not so much as to interfere with the proper operation of the cutter, but sufficiently so that the blade 20 will make cutting engagement with the anvil roll 14 at successively different points.

As has been stated, the bearing boxes 12 for the shaft 13 of the anvil roll, are mounted in ways 11 formed in the frame 10. This is in order to permit the roll 14 to be readjusted into proper position relative to the strip $a$ after such roll has been reground, which regrinding may be necessary from time to time. For that purpose screws 38 are threaded into the frame 10 so as to engage beneath and support bearing boxes 12. These screws are provided, at their lower ends, with bevel pinions 39 which mesh with corresponding pinions 40 carried by an adjusting shaft 41. By turning the shaft 41 in one direction or the other, the anvil roll 14 may be adjusted upward or downward, as may be required.

In the form of device shown in Figs. 3 and 4, the frame 42 has mounted therein, as before, bearings 43 for the anvil roll 44, the bearings being, in this instance, shown as stationary. A yoke 45 is slidably mounted in suitable ways in the frame, springs 46 being interposed between the yoke and the bearings 43, which springs tend to force the yoke 45 upward to cause ears 46 formed on the yoke to engage limiting lugs 47 which extend from the frame 42. The yoke 45 carries bearings for the shaft 48 of the blade holder 49 carrying the blade 50.

In this form of the device, but one motor, 51, is employed, the shaft 52 of this motor having a direct driving connection, through suitable universal joints, with the shaft 48 of the blade holder 49. The motor shaft 52 carries a pulley 53, and a belt 54 passes around this pulley and a pulley 55 mounted upon a shaft 56 which drives the shaft 57 of the anvil roll 44. In thus driving the anvil roll 44 by means of a belt from the drive shaft of the blade holder, a slight slippage of the belt occurs which results in a small difference between the rotary movement of the blade holder and that of the anvil roll. In this manner, the blade 50 is caused to engage the anvil roll, in successive cutting operations, at different points on the surface of the anvil roll, as in the construction employing two motors shown in Figs. 1 and 2.

The vertical movements of the blade-holder 49, to cause the strip to be severed, are controlled manually. To this end a gag slide 58 is mounted in suitable ways at the top of the yoke 45, and is connected, by means of a link 59, to an arm 60 extending upwardly from a rock shaft 61 adapted to be operated manually by means of a hand lever 62. A cross head 63 is slidably mounted in the frame 42 and is given a continuous vertical reciprocating movement through the agency of a link 64 pivoted upon the crank 65 of a crank shaft 66. The shaft 66 is driven by means of a gear 67 which meshes with another gear, 68, of the same diameter, carried by the shaft 52 of the motor 51.

In the normal operation of the device shown in Figs. 3 and 4, the cross head 63 reciprocates vertically without communicating any movement to the yoke 45, so that the blade holder 49 is maintained, by the springs 46, in an elevated position in which the blade 50 does not come into operative relation with the anvil roll 44. When, however, it is desired to sever the strip, the hand lever 62 is operated, at a time when the cross head 63 is in its uppermost position, to thrust the gag slide 58 between such cross head and the top of the yoke 45. Under those conditions, the cross head engages the top of the gag slide 58, and, through such gag slide, causes the yoke 45 to be depressed, the timing of the gears being such that when the yoke reaches its lowermost position the blade 50 is likewise in its lowermost position, that is, in a cutting position with respect to the anvil roll 44.

Figure 5:
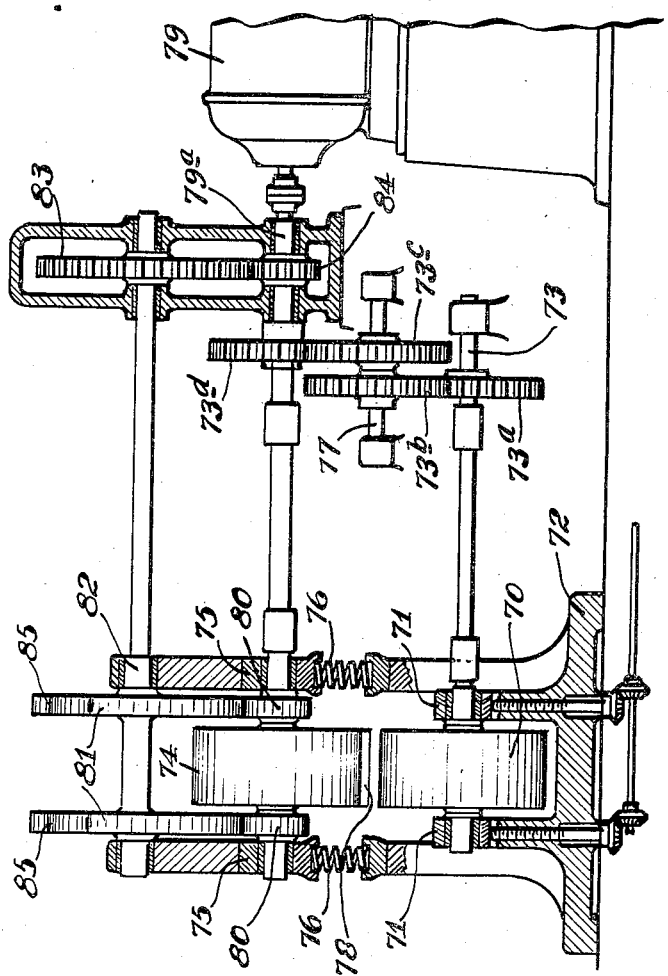
Fig. 5 is a sectional elevation, similar to Figs. 2 and 3, but showing a form of device in which the strip is severed at predetermined intervals, instead of at selective intervals as in the preceding forms, and in which gearing of a very small ratio is provided between the blade holder and the anvil roll, thereby to give slight difference of peripheral speed.

The form of device shown in Figs. 5 and 6 is especially adapted for cutting the strip at predetermined even intervals. In this construction, the anvil roll 70 is mounted, as before, in bearings 71 carried by the frame 72. The blade-holder 74 is carried in bearing blocks 75 which are mounted so as to be vertically reciprocable in the frame 72 and are normally held in an upward position by means of springs 76 disposed between them and suitable shelves with which the frame is formed. The blade-holder carries a blade 78 and is driven by means of an individual motor 79.

The shaft of the blade-holder 74 has mounted thereon a pair of cam rolls 80 which are engaged by a pair of cams 81 carried by a shaft 82 having its bearing in the upper part of the frame 72 and driven by means of a gear 83 which meshes with a pinion 84 on the shaft 79a of the motor 79. Each of the cams 81 is formed with a cam projection 85 of a sufficient depth to move the blade-holder downward far enough to bring the blade 78 into operative position with respect to the anvil roll 70.

For driving the anvil roll 70, the shaft of the latter has connected thereto a shaft 73 on which is mounted a gear 73a which meshes with a gear 73b carried by a counter shaft 77. The counter shaft carries a second gear 73c which meshes with a gear 73d mounted on the shaft 79a of the motor 79 which drives the cutter holder 74. Thus the anvil roll is driven directly and definitely from the cutter holder. By suitably apportioning the teeth of the gears 73a, 73b, 73c, 73d an exceedingly small gearing ratio between the cutter holder and the anvil roll can be secured. For instance, if the gear 73a had 201, the gear 73b 202, the gear 73c 201, and the gear 73d 200 teeth, the ratio would be $\frac{40401}{40400}$ between the anvil roll and the blade-holder, and the blade-holder would have to make over forty thousand rotations before the blade engaged the anvil roll for the second time at the same place.

In the operation of the device shown in Figs. 5 and 6, on each occasion that the cam projections 85 reach the cam rolls 80, the blade-holder 74 will be depressed, whereby the blade 78 will be brought into cooperative relation with the anvil roll 70 to sever the strip, it being understood that the gear wheel 83 and pinions 84 are of an even gear ratio, so that when the blade-holder is moved downward the blade 78 will always be in its lowermost, or cutting, position. Thus, by the device shown in these figures, the strip will be cut off at even intervals, the length of which will depend upon the gear ratio between the pinion 84 and gear wheel 83.

The form of device shown in Figs. 7 and 8, like that described above in connection with Figs. 5 and 6, is adapted to cut the strip in predetermined even lengths, though, in this instance, the anvil roll, instead of the blade-holder, is moved to effect the cutting operation. In the form of device shown in these figures, the blade-holder 85, carrying a blade 85a, has its shaft 86 mounted in fixed bearings in the frame 87, such shaft being driven by an individual electric motor 88. Mounted in suitable ways formed in the upper end of the frame 87 is a yoke 89 to which are secured a plurality of support rods 90 which extend downward past the frame 87 and through suitable guideways in the latter and have secured to the lower ends thereof a sub-frame 91, so that the sub-frame is suspended from the yoke, and, by its weight, pulls the latter downward. The shaft 92 of the anvil roll 93 is mounted in bearings carried by the sub-frame 91 and is driven by an individual motor 94, the weight of which may be balanced by means of a counter-weight 95.

Means are provided for vertically moving the yoke 89, and consequently sub-frame 91 and anvil roll 93, into and out of cutting relation with the blade 85a carried by the blade-holder 85. Such raising and lowering means comprises a cam 96 carried by a shaft 97 mounted in bearings in the frame 87 and driven by means of a gear wheel 98 from a pinion 99 on the shaft 86 of the blade holder 85. The cam 96 is formed with a cam projection 100 and engages against a cam roll 101 mounted in the yoke 89. The device shown in these figures operates in the same way as that shown in Figs. 5 and 6 except that the movement, to effect the cutting operation, is of the anvil roll rather than of the cutter drum.

It will be seen that each of the above described forms of the device provides a flying cutter which is exceptionally simple of construction and economical to build. It will be noted, further, that while control of the cutting operation, to sever the strip in either selective or predetermined lengths, is readily accomplished, yet there are no cutting elements which can get out of register owing to wear of the parts of the device or distortion of any of such parts under hard service. Another, and an especially important, advantage lies in the fact that while the cutting blade and the anvil roll are driven at peripheral speeds which are sufficiently close to the linear speed of the strip to permit perfect cutting, nevertheless, by reason of the fact that their speed is slightly different, the blade will make its cutting engagement with the anvil roll at different points on the periphery of the latter in the successive cutting operations, whereby undue wearing or damage to the anvil roll is effectually prevented, and whereby it becomes practicable to employ an anvil roll which is not hardened, so that the edge of the blade is maintained over a specially long period.

I claim:

1. A flying cutter for severing moving material comprising a rotatable blade, a rotatable anvil roll, means for supporting said blade and roll so as to permit relative movement of one towards and away from the other, means for rotating said blade and roll at peripheral speeds which are substantially the same as the linear speed of the material to be severed, said means being constituted to produce a relative peripheral movement between said blade and roll to cause said blade to cooperate with varying parts of said roll, and means effecting a relative movement between said blade and said roll when it is desired to sever the material.

2. A flying cutter comprising an anvil roll and a cooperating blade disposed substantially lengthwise of said roll, said roll and blade being rotatable on parallel axes, and means for rotating said roll and blade at peripheral speeds which are substantially synchronous, to permit them to move at peripheral speeds substantially equal to the linear speed of a strip moving longitudinally between the roll and the blade, whereby said strip is severed on the face of the roll transversely into sections, but sufficiently asynchronous to distribute the repeated operations of the blade over substantially the whole face of the anvil roll.

In testimony whereof, I sign my name.

FLORENCE C. BIGGERT, Jr.